Jan. 5, 1965  R. B. SHAW ETAL  3,164,657
ELECTRIC FURNACE CONSTRUCTION
Filed May 28, 1962
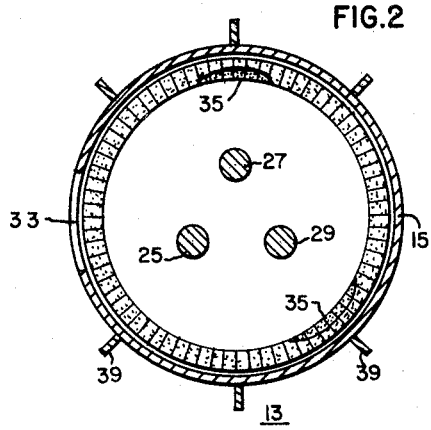
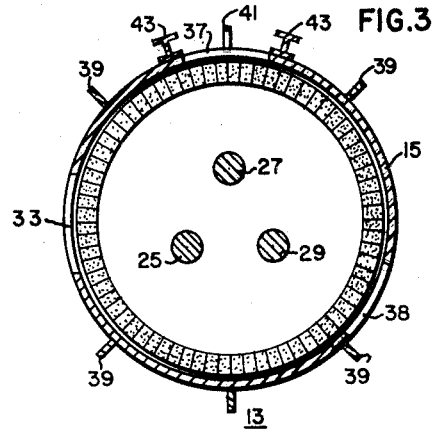
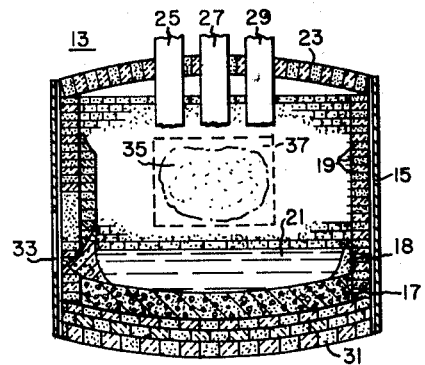
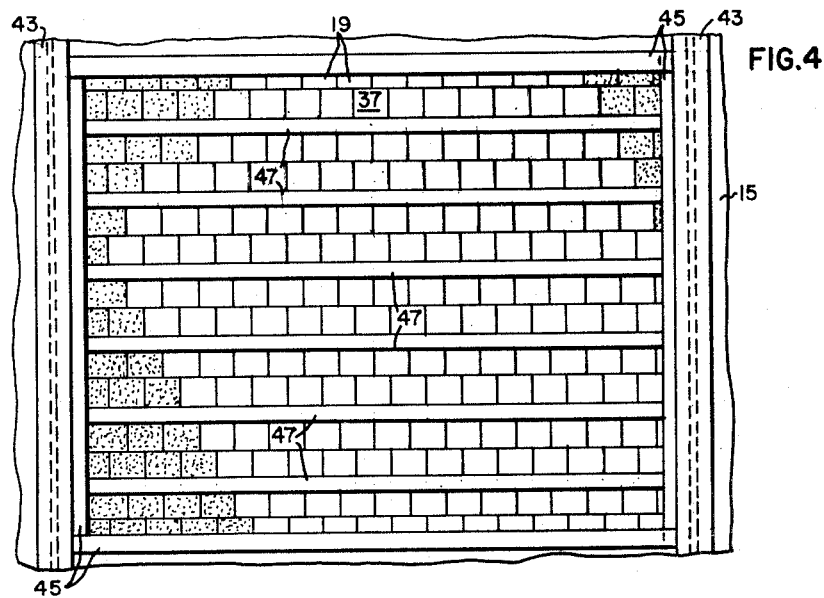

United States Patent Office 3,164,657
Patented Jan. 5, 1965

3,164,657
ELECTRIC FURNACE CONSTRUCTION
Richard B. Shaw and William G. Connor, Natrona Heights, Pa., assignors to Allegheny Ludlum Steel Corporation, Brackenridge, Pa., a corporation of Pennsylvania
Filed May 28, 1962, Ser. No. 198,248
3 Claims. (Cl. 13—9)

This invention relates to an improvement in electric steel-making furnace construction, and relates in particular to a modification in conventional electric arc furnaces that drastically reduces the adverse effects of "hot spots."

Arc melting furnaces, such as are commonly employed in the steel-making industry, are tank-like structures having a steel plate shell supported by buck stays and having one or two doors leading into the interior of the furnace and generally possessing a separate roof supported by a hydraulic system capable of raising the roof and of swinging it clear of the furnace. The over-all furnace structure is, of course, mounted on a platform that is disposed to tilt the furnace in order to tap it into a ladle through a pouring spout which is also an intricate part of the tank-like shell. Three electrodes project through the roof of the furnace and may be lowered into the tank-like structure. The steel plate walls (usually about 1" thick) of the furnace shell are conventionally lined with metal-encased magnesite brick (calcined magnesite or magnesia, sometimes called periclase brick). When melting down a charge, the electrodes are lowered until an arc is struck between them and the charge. Electricity flows between the electrodes and the charge. The electrodes are arranged for use with a 3-phase source of power from a transformer, one electrode to each phase. The arcs are drawn between the charge and electrodes, and, when drawn, are maintained during the melt for heating the charge. When a molten bath is obtained, or soon after the arcs are struck, a current flows from one electrode to the bath and back to the next electrode in a circular fashion encompassing all three electrodes. Such procedure is known to effect a flare or excessive amount of arcing from at least one of the electrodes, depending on the direction of the current and the natural unbalance of a 3-phase system such as is usual in electric arc furnaces of this type. The flare projects toward and up against the inner lining of the wall of the furnace adjacent to the electrode or electrodes effecting such a flare. Usually a flare will be effected by two of the three electrodes. The effect of the flares is to cause hot spots at the areas adjacent the electrodes in the furnace wall. Such hot spots cause excessive erosion of the refractory wall of the furnace, and the life of the furnace wall or lining (magnesite brick) is accordingly diminished.

It is customary practice to repair the refractory furnace wall, and particularly the ceramic material employed in the furnace floor, after practically each heat by the method of projecting granular dolomite onto the refractory wall by means of a "slinger" which is a machine having a hopper which feeds the granular dolomite onto a belt which, in turn, projects it into a stream onto the furnace wall. The most severe erosion occurs near the bottom of the furnace where the molen metal comes into direct contact with the refractory, but this is easily repaired or "dressed" with dolomite; however, the damage done to the side walls by arc flare cannot be adequately repaired by these means because such damage is on the vertical walls and the projected dolomite falls back onto the furnace floor. Additionally, the possibility of the hot spots caused by arc flare being adjacent to the doors is great, and since the furnaces are dressed with dolomite while hot (between heats), it is virtually impossible to direct the stream of dolomite directly at the damaged area from outside the furnace. Consequently, it is necessary to shut the furnace completely down once every two or three weeks in order to repair the damage caused by arc flare to the refractory wall.

It has now been found that three-phase electric arc furnaces may be modified or constructed in such a manner as to provide "picture windows" in the steel shell of the furnace in the areas adjacent to arc flare and materially extend the life of the refractory-encased brick lining.

It is, accordingly, the object of the present invention to provide a 3-phase electric arc steel-making furnace that is less susceptible to the effects of arc flare than the prior known furnaces of this type.

It is also an object of the present invention to provide an electric arc furnace structure that will possess "picture windows" in its outer steel shell in the area of arc flare that will extend the life of the refractory liner of the furnace.

Further objects and advantageous features of the electric arc furnace of the present invention will be obvious from the following specification and drawings wherein:

FIGURE 1 is a cross sectional side view of a furnace constructed in accordance with the present invention, but which is also illustrative of prior art furnaces of this type;

FIG. 2 is a cross sectional top view of the furnace of FIG. 1, as taken along the lines II—II thereof, illustrating the furnace as it would exist were it constructed in a conventional manner;

FIG. 3 is a cross sectional view taken along the lines II—II of FIG. 1, illustrating the furnace as constructed in accordance with the present invention, and FIG. 4 is a blown-up view of a picture window 37 as constructed in accordance with the furnace of the present invention.

In general, the present invention relates to the construction of electric arc furnaces wherein voids or picture windows are provided in the shell of the furnace in the areas adjacent to the electrodes normally susceptible to "hot spots" caused by electrode flare.

Arc flare and the resultant "hot spots" and consequent accelerated erosion in electric arc furnace walls are difficulties well known in the art, and considerable effort has been expended to reduce such phenomena. Particular efforts have been directed toward improvement in the magnesite brick employed for liners and in melting techniques. In recent years newly constructed electric furnaces operate on much higher electrical power (i.e., up to 70,000 kva. transformer capacity) than was previously considered possible. Consequently, hot spots have become and are becoming of increasing significance in melting techniques.

In FIG. 1 there is shown an electric arc melting furnace 13 composed of an outer steel shell 15 encasing a refractory floor 17 (generally constructed of dolomite) and a side wall of refractory brick 19 lining the inside area of the furnace above the molten metal 21. The roof 23 is also shown to be constructed of a refractory brick and there are shown, projecting through the roof 23, portions of three electrodes 25, 27 and 29. There is also shown refractory brick 31 which forms a base for the refractory dolomite floor 17 and a charging door 33 of which there may be several; however, in the present embodiment, for purposes of simplification there is only one shown. Dolomite repairs of the floor 17 and brick 19 are shown at 18. The electrodes 25, 27 and 29 during melting project downwardly to within a few inches of the molten metal 21 while the electrodes arc between the metal 21 and the electrodes themselves to provide the necessary heat. Arc flare from electrode 27 is shown to cause there to be a hot spot as shown at 35.

FIG. 2 shows a cross sectional view of the furnace of FIG. 1, assuming the furnace of FIG. 1 to be of conventional construction. In FIG. 2 there are shown two eroded or hot spot areas 35 which are caused by arc flare from electrodes 27 and 29. Such a situation is typical in that arc flare appears to originate at two of the three electrodes, and generally is more severe adjacent to one of the electrodes than the other. The reasons for this are not fully understood, but are believed to be caused by the fact that the 3-phase current is generally unbalanced in such a manner as to cause such a phenomenon. Consequently, the present invention is directed to a construction that will reduce the severity of the erosion or hot spots 35 by means of one or more picture shown in FIG. 3 at 37 and 38.

The illustration of FIG. 3 shows a cross section of FIG. 1 as modified to show picture windows 37 and 38. Picture windows 37 are also illustrated in FIG. 1 by a dotted line and identified as 37. The picture windows 37 and 38 are shown by FIG. 3 to be located as nearly adjacent to the electrodes 27 and 29 as possible. In some furnaces it may be desirable to provide such a picture window in the shell 15 of the furnace 13 adjacent to electrode 25 inasmuch as the presence or absence of hot spots 35 is dependent on the path of current flow rather than on a particular electrode so that if the current flow is reversed it may well be that a picture window in the vicinity of electrode 25 would be desirable. The members 39, shown particularly in FIGS. 2 and 3, are buck stays which are supporting members conventionally found supporting the shell 15 of electric arc furnace 13. In placing the picture window 37 as shown in FIG. 3, it was necessary to remove a portion of one of the buck stays 39, resulting in one sehort buck stay 41. I-beams 43 as shown in FIG. 3 are additional support members that provide additional support since the supporting and backing shell in the vicinity of the picture window 37 and a portion of one buck stay 39 have been removed. An enlargement of the picture window 37 is shown by FIG. 4 wherein it is shown that the I-beams 43 substantially replace one of the buck stays 39 as a supporting member. Additionally, frame members 45 provide a frame for the picture window 37. The view of the metal-encased refractory brick 19, as shown in FIG. 4, is a view of the back of the brick facing away from the electrodes. The bars 47 attached to frame members 45 prevent the bricks 19 from collapsing outwardly due to pressures of the molten metal 21 splashing within the furnace 13, or from being pushed out during changing of the furnace. Hence it may be seen that a large picture window is provided in the shell 15 of the furnace 13 adjacent to the two electrodes 27 and 29 which, in the present instance, causes arc flare, and consequently the windows 37 and 38 are adjacent to the hot spots normally occurring in the furnace of FIG. 1, it being understood, of course, that a picture window may be required adjacent to electrode 25, depending upon the direction of the current flow, in which event a picture window 37 or 38 may not be required.

In providing for picture windows as in the structure of the furnace of the present invention, it has been concluded that where no picture windows are employed there is a dead air space between the refractory liner 19 and the steel shell (generally about 1″ thick steel). Such dead air space inhibits cooling from the outside and causes the refractory brick to be hotter at a greater distance from the inside surface where melting and arc flaring are in progress, whereas by use of a picture window, the dead air space has been substantially eliminated and cooling of the refractory brick is much more effective and efficient. Hence, the temperature at a given distance from the outside surface of the refractory wall is lower than where no picture window has been provided. Consequently, any opening in the shell 19 in the vicinity adjacent to the electrodes of an electric arc furnace will provide some relief from a dead air space and reduce the effects of arc flare and hot spots. We have found it to be particularly advantageous to employ an opening of at least one foot by one foot to relieve the dead air space and reduce the effects of arc flare. However, such opening may be in the form of numerous perforations such as drilled holes and gratings in the vicinity adjacent to the electrodes. In employing picture windows of the present invention, we have employed openings approximately 4 feet by 6 feet. The opening has been framed by members such as shown by FIG. 4 at 45 to which there have been welded supporting bars 47. It is obvious that other supporting members can be employed.

We have had particular success by employing 3″ x 13″ metal-encased magnesite brick (dead burned magnesite or magnesia) as a refractory liner continuous with the furnace liner in the area of the picture window. Brick was selected that exhibited projecting metal tabs (not shown in the drawings) on the metal encasements so that these tabs would project outwardly from the furnace. The support members 19 were welded to these frame members so that they would abut against a number of metal tabs and add backing support so that metal splash or agitation inside the furnace or the charging operation would not cause the refractory in the area of the openings formed by the picture windows to collapse outwardly.

The exact refractory brick employed in the area of the picture windows was 70% $MgO$, balance $Cr_2O_3$; however, this specific brick was employed because it had metal tabs on the metal encasements. Composition of the brick is not believed to be critical, but must be a brick sufficiently refractory for application to electric arc furnace liners, whether or not such furnaces have picture windows. The metal encasements were made up of 18 and 22 gauge steel.

The effect of the picture windows is surprising. Instead of the refractory lining in the area of the hot spots lasting its usual two to three weeks, these liners were found to last five weeks and more. Not only is it possible to put in the liner from the outside and effect repairs to the furnace while it is still hot, hence eliminating much down-time of the furnace itself, but the hot spots or arc flare effect can be significantly lessened. It is our conclusion that the picture windows change the thermal gradient in the refractory lining so as to prolong its life.

There is no noticeable difference in electrical input (kws. per ton) where the picture window structure is employed.

It is to be appreciated that the embodiments of FIGS. 1 through 4 are illustrative only and do not show the entire structure of an electric furnace which would be unnecessary surplusage in the present description. Electric furnaces generally have pouring spouts, systems for removing the roof 23 and mechanical systems for lowering and raising electrodes 25, 27 and 29. It is obvious that such structures are incidental to the present invention and that the basic structure effected by applicants' invention has been adequately shown.

It should also be appreciated that distinct advantages are obtained by providing a single picture window adjacent to the electrode causing the most flare and the greatest hot spot erosion, but that at least two picture windows are preferred since, depending upon the current flow between the electrodes such as 25, 27 and 29, generally two hot spots are encountered. It will also be appreciated that in some cases where current flow is occasionally reversed, three picture windows, one adjacent to each of the three electrodes 25, 27 and 29, will be desired.

We claim:

1. In a three-phase electric arc furnace composed of a steel tank-like shell lined on its inside walls with refractory brick and disposed to receive three electrodes lowered from the top so as to effect electric arcing between a metal charge within said furnace and said electrodes, the improvement of providing at least one opening in said shell in the area adjacent at least one of said electrodes, said area being located at a hot spot caused by arc deflection so as to provide an air passageway from the normally dead air space between the refractory brick and the shell to the outside of the furnace.

2. In a three-phase electric arc furnace composed of a steel tank-like shell lined on its inside walls with refractory brick and disposed to receive three electrodes lowered from the top so as to effect electric arcing between a metal charge within said furnace and said electrodes, the improvement of providing at least one opening in said shell in the area adjacent at least one of said electrodes, said area being located at a hot spot caused by arc deflection, each of said openings adjacent any one of said electrodes being equivalent in area to at least one square foot so as to provide an air passageway from the normally dead air space between the refractory brick and the shell to the outside of said furnace.

3. In a three-phase electric arc furnace composed of a steel tank-like shell lined on its inside walls with refractory brick and disposed to receive three electrodes lowered from the top so as to effect electric arcing between a metal charge within said furnace and said electrodes, the improvement of providing two openings in said shell in the area adjacent two of said electrodes, each area being located at a hot spot caused by arc deflection, each said openings being equivalent in area to at least one square foot so as to provide an air passageway from the normally dead air space between the refractory brick and the shell to the outside of said furnace.

References Cited in the file of this patent
UNITED STATES PATENTS 1,393,371    Hoopes _____ Oct. 11, 1921